(12) United States Patent
Amer-Yahia et al.

(10) Patent No.: US 8,005,817 B1
(45) Date of Patent: Aug. 23, 2011

(54) SYSTEM AND METHOD FOR PROVIDING STRUCTURE AND CONTENT SCORING FOR XML

(75) Inventors: Sihem Amer-Yahia, New York, NY (US); Nikolas Koudas, Toronto (CA); Amelie Marian, New York, NY (US); Divesh Srivastava, Summit, NJ (US); David Toman, Waterloo (CA)

(73) Assignee: AT&T Intellectual Property II, L.P., New York, NY (US)

( * ) Notice: Subject to any disclaimer, the term of this patent is extended or adjusted under 35 U.S.C. 154(b) by 690 days.

(21) Appl. No.: 11/290,858

(22) Filed: Nov. 30, 2005
(Under 37 CFR 1.47)

(51) Int. Cl.
*G06F 17/30* (2006.01)
(52) U.S. Cl. .......................... 707/713; 707/715
(58) Field of Classification Search ............. 707/1–10, 707/101–102, 104.1, 713, 715
See application file for complete search history.

(56) References Cited

U.S. PATENT DOCUMENTS

| | | | | |
|---|---|---|---|---|
| 5,835,087 A * | 11/1998 | Herz et al. | ...................... | 715/810 |
| 5,956,707 A * | 9/1999 | Chu | ............... | 707/759 |
| 5,960,427 A * | 9/1999 | Goel et al. | ............................. | 1/1 |
| 5,963,940 A * | 10/1999 | Liddy et al. | ........................ | 707/5 |
| 6,269,368 B1 * | 7/2001 | Diamond | ........................... | 707/6 |
| 7,219,091 B1 * | 5/2007 | Bruno et al. | ....................... | 707/3 |
| 2001/0044794 A1 * | 11/2001 | Nasr et al. | ........................... | 707/4 |
| 2002/0198874 A1 * | 12/2002 | Nasr et al. | .......................... | 707/3 |
| 2004/0243799 A1 * | 12/2004 | Hacigumus et al. | ........... | 713/150 |
| 2006/0242102 A1 * | 10/2006 | Bruno et al. | ....................... | 707/1 |
| 2007/0112736 A1 * | 5/2007 | Okamoto et al. | .................. | 707/3 |
| 2007/0112813 A1 * | 5/2007 | Beyer et al. | .................... | 707/101 |

OTHER PUBLICATIONS

Y. Lee et al. (EDs.), "Counting Relaxed Twig Matches in a Tree": DASFAA 2004, LNCS 2973, pp. 88-99 2004.*
Arnon Rosenthal, "Outerjoin Simplification and Reordering for Query Optimization", ACM transactions on Database Systems, vol. 22, No. 1, Mar. 1997, pp. 43-74.*
Amer-Yahia et al., "Tree Pattern Relaxation", EDBT 2002, 8$^{th}$ Int'l. Conference on Extending Database Tech., vol. 2287, 2002. Germany, pp. 496-513.
Marian, A. et al., "Adaptive Processing of Top-k Queries in XML", Proceedings of the 21$^{st}$ Int'l Conference on Data Engineering, Apr. 5, 2005, pp. 162-173.

* cited by examiner

*Primary Examiner* — Hanh B Thai

(57) ABSTRACT

A system, method and computer readable medium are disclosed. The method embodiment relates to a method of computing score of candidate answers to a database query. The method comprises receiving a database query, assigning a first score to a match to the query, the first score being associated with a relative importance of an individual keyword in a collection of documents based on all structural and content predicates in the query, assigning a second score to the match, the second score being associated with a relative importance of a keyword in an individual document and using the assigned first score and second score to compute an answer score for the query.

18 Claims, 11 Drawing Sheets

SYSTEM AND METHOD FOR PROVIDING STRUCTURE AND CONTENT SCORING FOR XML

RELATED APPLICATION

The present application is related to Ser. No. 11/290,857 filed on the same day as the present application, which application is incorporated herein by reference.

BACKGROUND OF THE INVENTION

1. Field of the Invention

The present invention relates to XML data and more specifically a system and method of providing structure and content scoring for XML.

2. Introduction

XML data is now available in different forms ranging from persistent repositories such as the INEX and the US Library of Congress collections to streaming data such as stock quotes and news. Such data is often queried on both structure and content. Due to the structural heterogeneity of XML data, queries are usually interpreted approximately and top-k answers are returned ranked by their relevance to the query. The term frequency (tf) and inverse document frequency (idf) measures, proposed in Information Retrieval (IR), are widely used to score keyword queries, i.e., queries on content. Those of skill in the art will understand principles associated with IR. However, although some recent proposals of scoring methods that account for structure for ranking answers to XML queries, none of them fully captures fully the possible information available for computing answer scores. Accordingly, what is needed in the art is an improved method for computing answer scores.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention utilizes both structure and content and uses query relaxation in computing answer scores. The inventors propose scoring methods inspired by tf*idf to capture scoring and ranking queries both on structure and content. These methods rely on query relaxation techniques applied to structural predicates, i.e., XPath axes, as referenced in S. Amer-Yahia, L. Lakshmanan, S. Pandit. FleXPath: Flexible Structure and Full-Text Querying for XML. SIGMOD 2004, incorporated herein by reference. The inventors define one embodiment of the invention as twig scoring, which is a method of reference as it accounts for all structural and content correlations in the query. Twig scoring is time and space consuming because it requires computation of the scores of all relaxed versions of a query. Another proposed embodiment of the invention relates to path scoring as an approximation of twig scoring that loosens correlations between query nodes when computing scores, thereby reducing the amount of time required to compute and access scores during top-k query processing.

The idea in path scoring is to decompose the twig query into paths, compute the score of each path assuming independence between paths, and combine these scores into an answer score. This is in the same spirit as the vector space model of IR where independence is assumed between query keywords and answer scores are computed as a combination of individual query keywords' scores.

The inventors have also proposed binary scoring that also accounts for structural predicates and that computes answer scores by combining scores of individual child and descendants predicates in the query thereby assuming independence between all predicates. See, A. Marian, S. Amer-Yahia, N. Koudas, D. Srivastava. Adaptive Processing of Top-k Queries in XML. ICDE 2005. This scoring method is in fact an approximation of twig and path scoring that needs less time and space in exchange for a degradation in score quality.

Efficient top-k processing requires the ability to prune partial query matches, i.e., those that will never make the top-k answer list, as early as possible during query evaluation. Given a query and a scoring method, different answers might have different scores depending on which relaxed form of the query they satisfy. In addition, the same answer might have a different score from one scoring method to another. However, all the above scoring methods guarantee that more precise answers to the user query are assigned higher scores. This property can be used by any top-k algorithm since pruning is based on determining the most accurate score of a partial match using the query that the match satisfies best at a certain point in query evaluation and, identifying the best score growth of a partial match. Developing the right data structure and access method to store scores is a key factor in the efficient evaluation of ranked query answers. The inventors show how organizing query relaxations with their scores in a DAG structure, and using a matrix to quickly determine the score of a partial match, leads to efficient query evaluation and top-k processing.

In summary, the following contributions are made by the embodiments of the invention disclosed herein. Twig scoring is a reference method for XML that is inspired by tf*idf in order to capture scoring query answers on both structure and content while accounting for query relaxation. Path scoring is an approximation of twig scoring that reduces processing time. All these scoring methods including binary scoring rely on the ability to evaluate structural predicates approximately. A DAG is proposed to maintain precomputed idf scores for all possible relaxed queries that a partial match may satisfy. A matrix representation is used for queries, their relaxations, and partial matches to quickly determine the relaxed query that is best satisfied by a partial match during top-k query processing and prune irrelevant partial query matches. All the scoring methods were implemented in conjunction with a top-k processing algorithm. Extensive experiments were run on real and synthetic datasets and queries and showed that, compared to twig scoring, path scoring achieves very high precision for top-k queries while requiring moderate time. Binary scoring results in high savings in time and space, but exhibits significant degradation in answer quality.

XML repositories are usually queried both on structure and content. Due to structural heterogeneity of XML, queries are often interpreted approximately and their answers are returned ranked by scores. Computing answer scores in XML is an active area of research that oscillates between pure content scoring such as the well-known tf*idf and taking structure into account. However, none of the existing proposals fully accounts for structure and combines it with content to score query answers. The inventors propose novel XML scoring methods that are inspired by tf*idf and that account for both structure and content while considering query relaxations. Twig scoring, accounts for the most structure and content and is thus used as our reference method. Path scoring is an approximation that loosens correlations between query nodes hence reducing the amount of time required to manipulate scores during top-k query processing. The inventors provide efficient data structures in order to speed up ranked query processing. Experiments validate the scoring methods and that show that path scoring provides very high precision while improving score computation time.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1A:
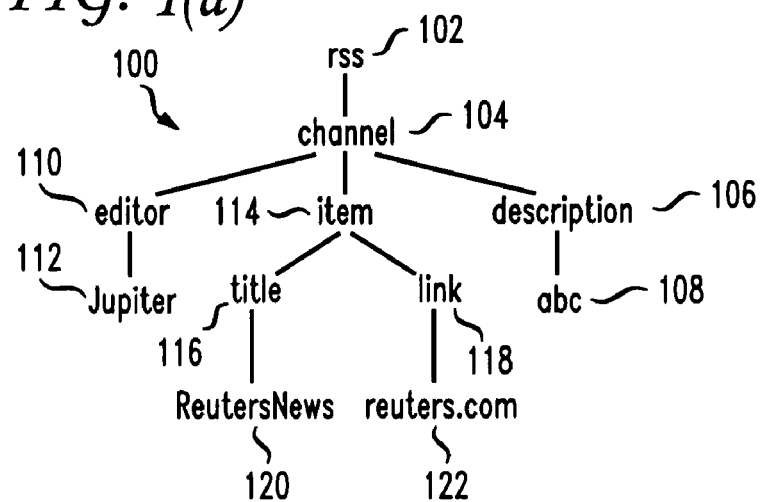
FIG. 1 illustrates heterogeneous XML database examples.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Scoring for XML is an active area of research. However, with the exception of binary scoring, none of the existing proposals accounts for structural query relaxations while scoring on both structure and content. However, the binary scoring method that the inventors proposed, while efficient, does not provide high quality answers compared to the twig scoring method.

The INitiative for the Evaluation of XML retrieval (INEX) promotes new scoring methods for XML. INEX now provides a collection of documents as a testbed for various scoring methods in the same spirit as TREC was designed for keyword queries. Unfortunately, none of the proposed methods used in INEX as yet is based on structural relaxations to compute scores. As a result, the INEX datasets and queries would need to be extended to account for structural heterogeneity. Therefore, they could not be used to validate our scoring methods. As part of this effort, XIRQL is based on a probabilistic approach to compute scores at document edges and combines them to compute answer scores. The score of each keyword uses a path expression associated to the keyword in a query instead of document-based scores as in traditional IR. However, no relaxations are applied to path expressions. Similarly, JuruXML allows users to specify path expressions along with query keywords and modifies vector space scoring by incorporating a similarity measure based on the difference in length, referred to as length normalization, between the path expression provided in the query and the closest path in the data. The inventors believe that relying on a principled way of applying relaxations to XPath queries carries more semantics than length normalization.

In F. Weigel, H. Meuss, K. U. Schulz, F. Bry. Content and Structure in Indexing and Ranking XML. WebDB 2004, the authors study the relationship between scoring methods and XML indices for efficient ranking. They classify existing methods according to keyword and path axes. Based on that classification, they show that ranking on both structure and content are poorly supported by existing XML indices and propose IR-CADG, an extension to dataguides to account for keywords, that better integrates ranking on both structure and content. They show experimentally that this index outperforms existing indices that separate structure and content. It considers simple path queries but does not account for relaxations.

Several query relaxation strategies for graph and tree queries have been proposed before. The inventors herein apply the relaxation framework defined in S. Amer-Yahia, L. Lakshmanan, S. Pandit. FleXPath: Flexible Structure and Full-Text Querying for SML. SIGMOD 2004, incorporated herein by reference, since it captures most previously proposed relaxations and is general enough to incorporate new relaxations. While in that paper, the focus was on defining a relaxation framework and query evaluation strategies assuming a given scoring function. The inventors herein focus on scoring methods and data structures to evaluate top-k XML queries.

Figure 1B:
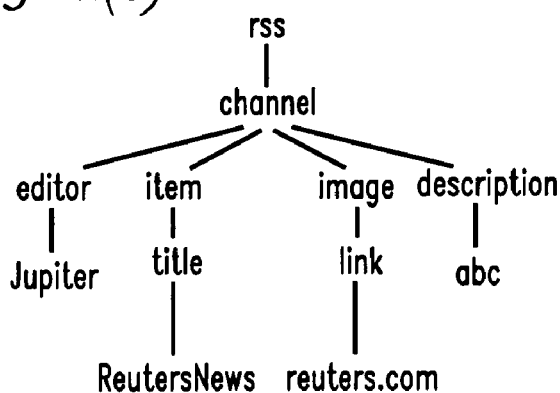
Figure 1C:
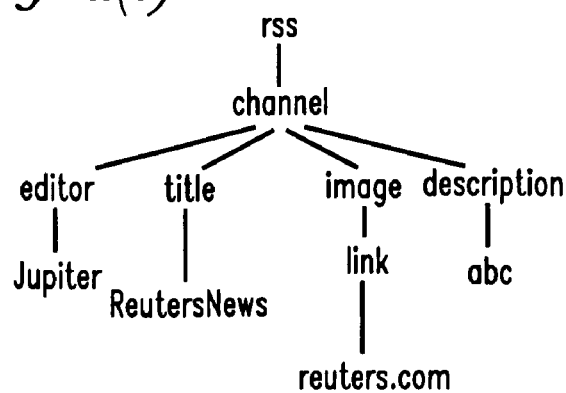

The inventors represent XML data as forests of node labeled trees. FIG. 1 shows an example database instance 100 containing fragments of heterogeneous news documents. Document (a) shows features rss 102, channel 104, description 106, abc 108, editor 110, Jupiter 112, item 114, title 116, link 118, ReutersNews 120 and reuters.com 122. Documents (b) and (c) are different examples of documents.

FIG. 2 shows query tree patterns 200 and relaxations (a), (b), (c), (d), (e) and (f). FIG. 2 gives examples of several queries drawn as trees: the root nodes 202 represent the returned answers, single and double edges the descendant and child axes, respectively, and node labels names of elements or keywords to be matched item 204, title 206, ReutersNews 210, link 208 and reuters.com 212.

Different queries match different news documents in FIG. 1. For example, query (a) in FIG. 2 matches document (a) in FIG. 1 exactly, but would neither match document (b) (since link is not a child of item) nor document (c) (since item is entirely missing). Query (b) of FIG. 2 matches document (a) in FIG. 1 since the only difference between this query and query (a) is the descendant axis between item and title. Query (c) matches both documents (a) and (b) since link is not required to be a child of item while query (d) matches all documents in FIG. 1.

Intuitively, it makes sense to return all three news documents of FIG. 1 as candidate matches, suitably ranked based on their similarity to query (a) in FIG. 2. Queries (b), (c) and (d) in FIG. 2, correspond to structural relaxations of the initial query (a).

In the same manner, none of the three documents in FIG. 1 matches query (e) because none of their titles contains reuters.com. Query (f) of FIG. 2, on the other hand, is matched by all documents because the scope of reuters.com is broader than in query (e). It is thus desirable to return these documents suitably ranked on their similarity to query (e).

In order to achieve the above goals, the inventors use, for example, three relaxations: edge generalization (replacing a child axis with a descendant axis), leaf deletion (making a leaf node optional) and subtree promotion (moving a subtree from its parent node to its grand-parent). These relaxations capture all the structural and content approximations described in the examples. However, approximate keyword queries based on techniques such as stemming and ontologies, are orthogonal to and beyond the scope of this work.

Our relaxations capture approximate answers but still guarantee that exact matches to the original query continue to be matches to the relaxed query. For example, query (b) can be obtained from query (a) by applying edge relaxation to the axis between item and title and still guarantees that documents where title is a child of item are matched. Query (c) is obtained from query (a) by composing edge generalization between item and title and subtree promotion (applied to the subtree rooted at link). Finally, query (d) is obtained from query (c) by applying leaf deletion to the nodes Reuters News, title and item. Query (d) is a relaxation of query (c) which is a relaxation of query (b) which is a relaxation of query (a).

Similarly, query (f) in FIG. 2 can be obtained from query (e) by a combination of subtree promotion and leaf deletion. In order to distinguish between answers to different relaxations of the same query, the inventors need a scoring method to compute the relevance of each query answer to the initial user query. The traditional tf*idf measure is defined in IR for keyword queries against a document collection. The idf, or inverse document frequency, quantifies the relative importance of an individual keyword in the collection of documents. The tf, or term frequency, quantifies the relative importance of a keyword in an individual document. In the vector space model, query keywords are assumed to be independent of each other, and the tf*idf contribution of each keyword is added to compute the final score of a document.

In the context of the present invention, the most accurate scoring method would compute the score of an answer taking occurrences of all structural and content (i.e., keyword) predicates in the query. For example, a match to query (c) would be assigned an idf score based on the fraction of the number of channel nodes that have a child item with a descendant title containing the keyword ReutersNews and a descendant link that contains the keyword reuters.com. Such a match would be assigned a tf score based on the number of query matches for the specific channel answer. This method is referred to as twig scoring and relates to one of the embodiments of the invention disclosed herein.

While twig scoring captures all correlations between nodes in the query and thus has certain benefits, it is time and memory consuming because it requires computation of the scores of each relaxed query. Therefore, another embodiment of the invention relates to path scoring that loosens the correlations between query nods by assuming independence between root-to-leaf paths in the query, computing their scores and combining those scores to compute an answer score. For example, for query (a) in FIG. 2, twig scoring is based on the number of channel nodes that have an item with a title containing ReutersNews and a link containing reuters.com while path scoring relies on decomposing the query into its two paths, computing their scores separately and combining them to computer an answer score. Hence, it might not always distinguish between answers to different relaxed queries as well as twig scoring.

The scoring method proposed in A. Marian, S. Amer-Yahia, N. Koudas, D. Srivastava, Adaptive Processing of Top-k Queries in XML, ICDE 2005, is another approximation of twig scoring referred to as binary scoring because it scores binary predicates with respect to the query root, and assumes independence between those predicates. In query (a) in FIG. 2, that would amount to computing the scores of the child predicate between channel and item and the scores of descendant predicates between channel and each one of the remaining nodes in the query including keyword nodes.

Scores need to be organized in such a way that helps to determine the highest score of a partial match during top-k processing in order to speed up pruning of irrelevant answers. To avoid computing scores on-demand, query evaluation could take advantage of the fact that idfs are shared across all partial matches that satisfy the same (relaxed) query. For example, all answers that match query (b) in FIG. 2 and not query (a) would have the same idf. Therefore, the inventors propose to precompute and store idfs for all possible relaxations of the user query. This allows for fast access to score values during query processing. Two data structures are used: a Query Relaxations DAG, and a Query Matrix, discussed in the next section.

Next, the inventors formally define approximate answers to twig queries based on the notion of query relaxation and the corresponding scoring methods. Previously defined twig queries are used, an important subset of) (Path. A twig query X (on k nodes) is a rooted tree with string-labeled nodes and two types of edges, /(a child edge) and // (a descendant edge). The root node root of Q is called the distinguished answer node.

The term match is used to denote the assignments of query nodes to document nodes that satisfy the constraints imposed by the query and the term answer to denote document nodes for which there is a match that maps the root of the query to such a node. Note that for a particular answer there can be multiple matches in a document. For example, in the document "<a><b/><b/></a>" there are two matches but only one answer to the query a/b. The term Q(D) denotes the set of all answers to Q in a document D.

Several definitions will provide further insight. Definition 1: Let Q and Q' be twig queries. Say that Q' subsumes Q if $Q(D) \subseteq Q'(D)$ for all documents D. To capture approximate answers to a given twig query, the inventors generate relaxed twig queries on a subset of the query nodes based on the following definition 2 of query relaxation. Definition 2 (Relaxation): Let Q be a twig query. Say that Q' is a simple relaxation of Q (and write $Q \mapsto Q'$) if Q' has been obtained from Q in one of the following ways:

an edge generalization relaxation: a / edge in Q is replaced by a // edge to obtain Q';

a subtree promotion relaxation: a pattern a[b[Q1]//Q2] is replaced by a[b[Q1] and .//Q2]; or a leaf node deletion relaxation: a pattern a[Q1 and .//b] where a is the root of the query and b is a leaf node is replaced by a[Q1].

The inventors say that Q' is a relaxation of Q (and write $Q \mapsto *Q'$) if it is obtained from Q by a composition of k simple relaxations ($k \geq 0$). Note that, given a query Q with the root labeled by a, the most general relaxation is the query a. The inventors denote this query by $Q\bot$. Every exact answer to a relaxation of Q is an approximate answer to Q, and the set of all approximate answers to Q in a document D is equal to $Q\bot(D)$.

The relaxations defined above do not capture approximating content such as using stemming or ontologies on keywords. While a detailed discussion of this direction is beyond the scope of the paper, the actual way of relaxing matches to keywords is orthogonal to the remaining development in the paper. The inventors organize the set of all relaxations of a query into a directed acyclic graph (DAG) in which edges relate relaxations in a subsumption relation. Two preliminary lemmas and their proofs are set forth next:

Lemma 3 Let Q and Q' be twig queries such that Q ↦ *Q'. Then Q(D) ⊂ Q'(D) for all documents D.

Proof: Each simple relaxation satisfies the statement of the lemma (by inspection); the rest follows from transitivity of the inclusion relation.

Lemma 4 Let Q and Q' be two twig queries such that Q ↦ *Q' and Q' ↦ *Q. Then Q≡Q'.

Proof: From Lemma 3 it is known that Q(D) ⊂ Q'(D) and Q'(D) ⊂ Q(D) for all documents D. Thus .Q≡Q'. However, this is only possible if Q=Q' (syntactically) as each simple relaxation produces a strictly less restrictive query.

Equipped with these two lemmas the inventors can organize the relaxations in a DAG as follows: Definition 5 (Relaxation DAG) Let Q be a twig query. The inventors define RelDAG$_Q$=({Q'|Q ↦ *Q'},{(Q',Q")|Q ↦ *Q'^Q' ↦ Q"})

Figure 2A:
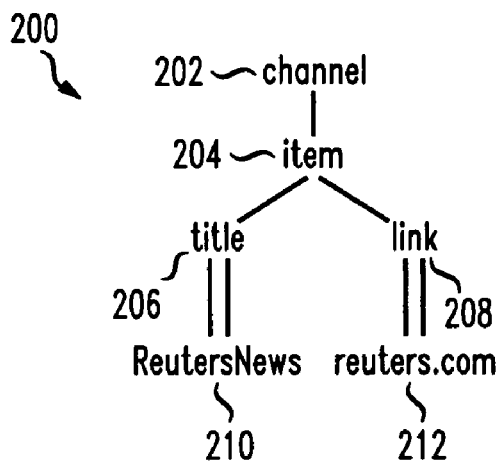
FIG. 2 illustrates query tree patterns and relaxations.
Figure 2B:
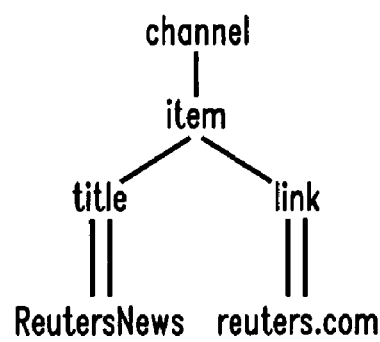
Figure 2C:
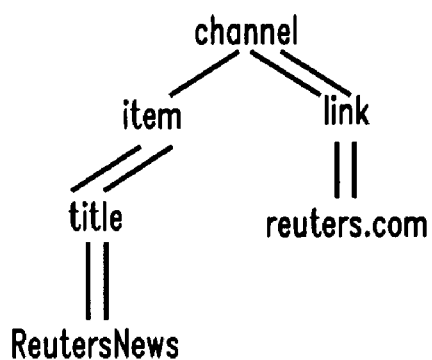
Figure 2D:
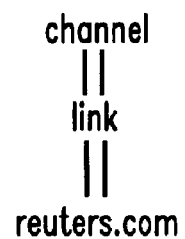
Figure 2E:
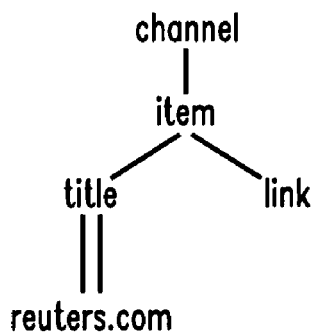
Figure 2F:
Figure 3:
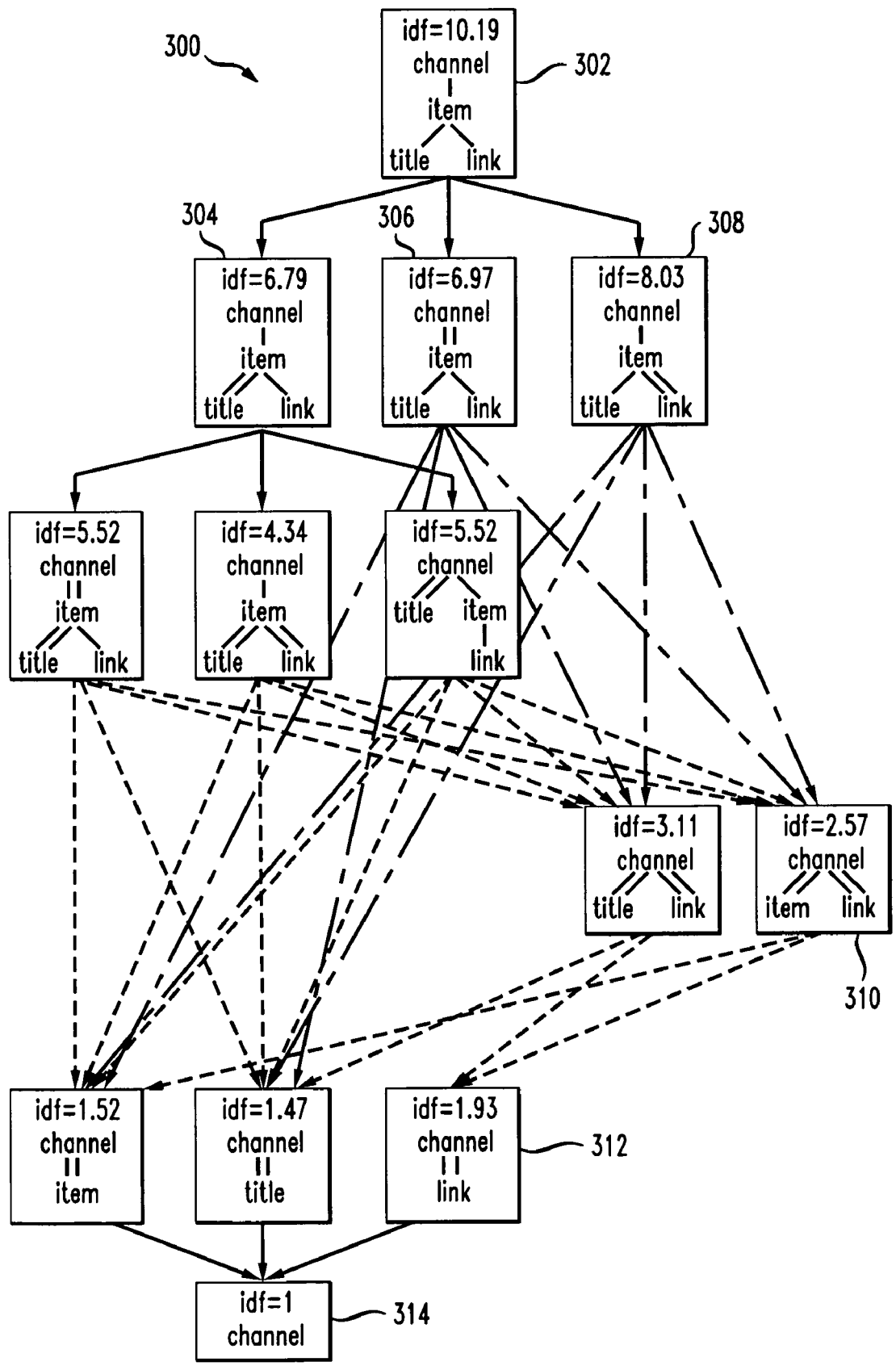
FIG. 3 illustrates a query relation DAG.

FIG. 3 illustrates a Query Relaxations DAG 300. FIG. 3, disregarding the numerical scores attached to nodes, shows the DAG 300 created for a simplified query (a) in FIG. 2. Given a query Q, Algorithm 1 is used to build the DAG in a top-down fashion, starting with a node containing the query Q, applying the simple relaxation steps, and merging identical DAG nodes on the fly. This leads to the following algorithm:

---

Algorithm 1 buildDAG Function

---

Require: currentDAGNode
1:  Q=getQuery(currentDAGNode):
2:  for each node n in Q do
3:    if (canBeRelaxed(n.parent(n))) then
4:      newDAGNode = getDAGNode(edgeGeneralize(n.Q));
        {getDAGNode checks if a DAG node containing query Q with the edge generalized exists, returns it if it does or creates it if it does not.}
5:    else if (not isQueryRoot(parent(n))) then
6:      newDAGNode = getDagNode(promoreSubtree(n,Q));
7:    else if noDescendants(n) then
8:      new DAGNode = getDAGNode(leafDelete(n,Q));
9:    end if
10:   addChild(currentDAGNode.newDAGNode); {addChild adds newDAGNode as a child of currentDAGNode in the DAG.}
11:   buildDAG(newDAGNode); {recursive call on newDAGNode.}
12: end for

---

Theorem 6 Let X be a twig query. Then Algorithm 1 produces RelDaG$_Q$.

Proof: For a query relaxation node in the DAG and for every node in that relaxation the algorithm applies all allowed simple relaxations (cf. Definition 2: only one simple relaxation applies per node in a query). Nodes representing these relaxations become the children of this node in the DAG; new nodes are only created when they don't already exist. The reminder of the proof is a simple induction on the distance of a node from the root of the DAG. Termination of the algorithm is guaranteed as there are only finitely many relaxations of a given query.

As the approximate answers to a query Q are simply answers to the relaxation Q⊥, the inventors' goal is to rank elements of Q⊥(D) by assigning numerical values using a scoring function. The basic idea is that scores are based on considering best matches for a given answer-matches to the least relaxed query in the DAG.

The scoring function is based on the tf*idf measure proposed in IR. However, the inventors have to modify this measure to distinguish among matches to different relaxations of the original query. The inventors first define the modification of the inverse document frequency (idf):

Definition 7 (idf of a Relaxation) Let Q and Q' be twig queries such that Q ↦ *Q' and D an XML document. The inventors define $$IDF_D^Q(Q')=|Q\perp(D)|/|Q'(D)|;$$

This measure is extended to all approximate answers e∈Q⊥ by defining IDF$_D^Q$(e)=max{IDF$_D^Q$(Q')|e∈Q'(D),Q ↦ *Q'}. A relaxation Q' that maximizes IDF$_D^Q$(e) is a most specific relaxation of Q for e and denote the set of these relaxations by MSR$_D^Q$(e).

The inventors idf scoring approach guarantees that answers to less approximate queries obtain idf scores at least as high as scores to more approximate ones; this is also the basis for assuring that the score-monotonicity requirement is met by the overall score of an answer. In particular:

Lemma 8 Let Q' and Q" be two relaxations of Q such that Q' ↦ *Q. Then IDF$_D^Q$(Q')≧IDF$_D^Q$(Q") for any document D.

Proof: By definition, any answer to Q" is an answer to Q', as Q" is a relaxed version of Q'. Therefore, the denominator value in the idf function for the computation of Q" is greater than or equal to the denominator value in the idf function for the computation of Q. It results that IDF$_D^Q$(Q')≧IDF$_D^Q$(Q").

Thus, since the idf score for an answer e is defined as the maximal idf value of all relaxations of Q having e as an answer, the above lemma also shows that IDF$_D^Q$(e)≧IDF$_D^Q$(e') whenever the best match for e matches a less relaxed query than the best match for e'.

Intuitively, the idf measure of a query Q quantifies the extent to which answers to Q⊥ in D additionally satisfy Q. Thus, more selective queries are assigned higher idf scores. This is akin to the IR case: keywords that appear in a document collection less frequently are assigned higher idf scores.

Note, however, that the idf measure defined above assigns the same idf score to all exact matches to a query Q. In general, all answers having their best match with respect to the same relaxed query are given the same idf score. On the other hand, the idf measure becomes useful once the inventors allow for relaxed matches to the query Q, as described in Section 3. The idf scores are then used to rank relaxed matches based on how closely they match the relaxed query. To distinguish between matches of the same relaxed query the inventors use the analogue of the term frequency (tf) measure:

Definition 9 (tf of an Answer) Let Q be a twig query and D an XML document. Then, for an answer e∈Q(D), the inventors define $$TF_D^Q(e,Q')=|\{f|f \text{ a match of } Q' \text{ in } D, f(\text{root}Q')=e\}|$$

for Q' a most specific relaxation of Q for e, and $$TF_D^Q(e)=\max\{TF_D^Q(e,Q')|Q'\in MSR_D^Q(e)\}.$$

Intuitively, the tf score of an answer quantifies the number of distinct ways in which an answer matches a query. This is again akin to the IR case where the term frequency increases with the number of occurrences of a keyword in a document. The final scoring function for twig queries is based on combining the idf and tf scores. A lexicographical (idf, tf) ordering is used to satisfy the score monotonicity requirement. More definitions follow.

Definition 10 (Lexicographical Score): Let D be an XML document, Q a query, and e and e' approximate answers to Q in Dk. The inventors define $$e \leq e' \text{ if } (IDF_D^Q(e) < IDF_D^Q(e')) \text{ or}$$

$$(IDF_D^Q(e) = IDF_D^Q(e') \text{ and } TF_D^Q(e) \leq TF_D^Q(e'))$$

Using this definition and Lemma 8 the inventors have:
Theorem 11 Let $e, e' \in Q\bot(D)$, Q' and Q'' be the most specific relaxations of Q for e and e' in D, respectively, such that $Q' \mapsto {}^*Q$. Then $e \leq e$.

Note that the more common combinations of the tf and idf scores, e.g., the $TF_D^Q(e)*IDF_D^Q(e)$ function, do not adhere to our requirement of matches to less relaxed queries to be ranked higher. Consider, for example, the query a/b posed over the concatenation of two documents "<a><b/></a>" and "<a><c><b/> ... </c><a>" with l>2. nested "b" elements. Then the idf scores for a/b and the relaxation a//b are 2 and 1, respectively. However, the tf measures are 1 and l (the letter "L"). Thus the more common tf*idf ranking would prefer the second (less precise) answer. Note also, that dampening the tf factor, e.g., using a log function, cannot solve this inversion problem as one can choose l (the letter "L") to be arbitrarily large.

The inventors use twig scoring as the reference measure of correctness since it accounts for the most structure and content. However, to compute the scores of answers, one needs to have access to the idf scores associated to all relaxations of the original query. As pointed out above, computing (or even precomputing whenever possible) these scores can be very expensive. Thus in order to improve efficiency of the overall query processing, the inventors define approaches based on decomposing an original twig query to simpler queries and this way the inventors reduce the number of different idf scores needed. Also, in many cases the scores for such simpler queries are easier to compute. In particular, the inventors consider two decompositions decomp (Q) for a twig query Q:

Path Decomposition the set of all paths in Q leading from the root of QX to any other node in Q; and Binary Decomposition the set of all queries $Q_i = \text{root}_Q/m$ or $Q_i = \text{root}_Q//m$ form in a node in Q such that $Q \subseteq Q_i$.

The decompositions for our example query are as follows:

Example 12

The Sets of Queries

{channel/item/title, channel/item/link},
{channel/item, channel//title, channel//link}
are the Path and Binary Decompositions, respectively, of a twig query
"channel/item[.title]/link".

For each decomposition, the inventors also need to define how the scores for the individual fragments are combined into a final answer score. The idf measure depends on whether joint (correlated) matches are considered only or assume independence between matches to the individual components of a twig query. Hence, there are two definitions of idf: one for the correlated case and one for the independent case.

Definition 13 (Path/Binary idf Score) Let Q be a twig query, Q' a relaxation of Q, and D an XML document. The inventors define $$IDF_D^Q(Q') = |Q_\bot(D)| \Big/ \left| \bigcap_{Q_i \in \text{decomp}(Q')} Q_i(D) \right|$$

for correlated scoring, and $$IDF_D^Q(Q') = \sum_{Q_i \in \text{decomp}(Q')} |Q_\bot(D)| / |Q_i(D)|$$

for independent scoring.

The idf score of an answer under the above assumptions is again the maximal idf of a relaxation containing the answer. The tf measure is the same in both cases as it is defined on a per-answer basis:

Definition 14 (tf for Path/Binary): Let Q be a twig query, Q' a relaxation of Q and D an XML document. Then, for $e \in Q(D)$, the inventors define $$TF_D^Q(e, Q') = \prod_{Q_i \in \text{decomp}(Q')} \left| \left\{ f \mid f \text{ a match of } Q_i \text{ in } D_i \atop f(\text{root}_{Q_i}) = e \right\} \right|$$

where Q' is a most specific relaxation for e, and $$TF_D^Q(e) = \max\{TF_D^Q(e,Q') | Q' \in MSR_D^Q(e)\}.$$

Similarly to the twig scoring, it can be shown that the lexicographical (idf, tf) ordering of query answers based on the scores obeys the score monotonicity requirement.

Note that the distinction between independent and correlated scoring only applies for binary and path scoring. Altogether the inventors have defined five scoring methods, listed in the order of increasing precision: binary-independent that considers all predicates to be independent, binary-correlated that takes into account correlations between individual binary predicates, path-independent that assumes independence between query paths, path-correlated, that takes into account the correlation both within paths and across paths in the query, and twig, the reference scoring method, that takes all of the query twig correlations into account.

In this section, the inventors discuss data structures that can be used by any top k processing algorithm to compute top-k answers to XML queries efficiently. As mentioned earlier, our DAG provides a convenient, constant-time access to the idf value of any partial match during query processing (see FIG. 3 for an example). This value can be computed using selectivity estimation techniques for twig queries. Note that every (even partial) match is an exact match to a relaxation of the original query. Also, for matches the following applies:
Lemma 15 Let Q be a query, D an XML document, and f a match for an answer $e \in Q\bot(D)$l. Then there is a unique query $Q' \in \text{RelDAG}_Q$ such that f is a match for $e \in Q'(D)$ and f is not a match for Q''(D)> in for any ancestor Q'' of Q' in $\text{RelDAG}_Q$.

Thus it is sufficient to associate a single score with every match. At each DAG node, the inventors keep the maximum theoretical upper bound for a partial match that satisfies the twig query associated with that node: if the query at that node includes all nodes of the original query, then a partial match that satisfies this twig query cannot be further extended, and its score upper bound value is equal to its idf value; however, if the twig query does not include all the nodes from the original query, e.g., if it is a relaxation of the original query where some leaf deletion operations were applied, the inventors store a pointer in the DAG to the DAG node containing the best relaxation such an incomplete partial match could satisfy. In the same manner, one can keep pointers in the DAG to access information such as the score upper bound values of all possible configurations of partial matches (some nodes missing, some nodes unknown), or the maximum score increase (in idf value) that would be gained from checking one of possible unknown nodes in the partial match. During query evaluation, idf's are accessed in constant time using a hash table to check the query partial matches against the twig queries stored in the DAG.

From Lemma 8, it follows that the deeper a query is in the DAG, the lower its idf is. An example of a query relaxation DAG for the (simplified) query from FIG. 2(a) is given in FIG. 3. Note that a, the lowest (most relaxed) query in the DAG, has an idf of 1 as it consists of returning every single distinguished node.

A query matrix is also proposed that is used to apply relaxations to queries during the DAG building step and, more importantly, to map a partial match to its corresponding query using matrix subsumption during query evaluation. By representing both partial matches and queries in the same framework, the inventors can compare them efficiently, by only requiring a matrix comparison.

The matrix is defined for twig queries on m nodes; the inventors assume that the nodes are named $\{n_1, \ldots n_m\}$.

Definition 16 (Matrix Representation): Let Q be a twig query on at most m nodes. The inventors define a m×m matrix $M_Q$ as follows:

$M[i, i] = a$ if the node $n_i \in Q$ has label $a$;

$M[i, i] = X$ if the node $n_i \notin Q$;

$M[i, i] = ?$ otherwise;

$M[i, j] = /$ if $n_i/n_j \in Q$;

$M[i, j] = //$ if there is a path from $n_i$ to $n_j$ in Q but $n_i/n_j \notin Q$;

$M[i, j] = X$ if $n_i, n_j \in Q$ and there is no path from $n_i$ to $n_j$;

$M[i, j] = ?$ otherwise.

A subsumption order between the symbols stored in the matrix cells is defined as follows: $a <?$, $/ <// <?$, and $X<?$. The reflexive subsumption order $\leq$ is the above order extended with the diagonal relation on the symbols. A partial match matrix can be defined similarly. It is easy to see that a lower matrix is sufficient to capture all the information represented in Q as queries are trees.

Figure 4:
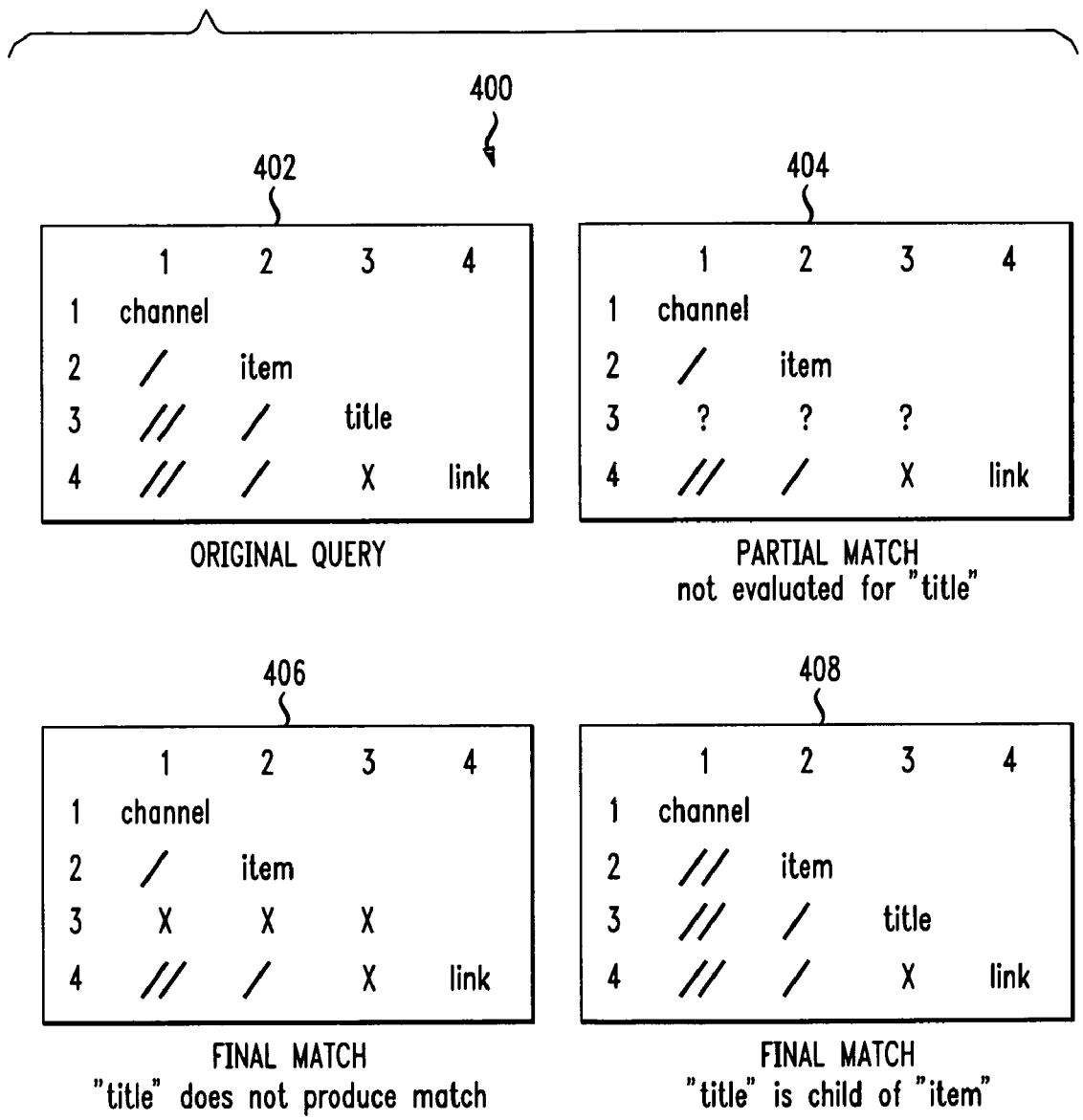
FIG. 4 illustrates various query matrices.

FIG. 4 shows a series of queries matrices 400. The query matrix for an original query 402 for the (simplified) query from FIG. 2(a), and several possible partial matches to this query that can be computed during query evaluation: 404 is a partial match that has not yet been checked against title, hence the corresponding entries are set to "?"; the relationship between channel and item for that partial match has been relaxed to "//". Match 406 is the same partial match as 404, with no title nodes found, the corresponding matrix entries are then equal to "X". Finally, match 408 is a extension of 404 for which an exact match for node title has been found.

Matrices are created for partial matches by checking their binary node relationships. Operations on matrices are performed in three situations: to create a relaxed version of a query in the DAG building process (e.g., by replacing all entries involved in an edge generalization with their relaxation), to check whether a query is a relaxation of another query (matrix subsumption), or to check whether a partial match maps to a query pattern (matrix subsumption). Matrix creation and subsumption operations need $(m^2/2)$ comparison where m is the number of query nodes. Since queries are expected to be fairly small, most often no larger than 10 nodes, this produces efficient computation times. Each matrix entry has a maximum of 4 possible entries therefore there are at most $4^{m^2/2}$ relaxations of a given query; the actual number tends to be much lower as most matrix combinations are not possible. This loose upper bound also gives us an upper bound on the size of the DAG, as there is only one DAG node per query relaxation.

In this paper, the inventors do not claim the top-k processing algorithm as a contribution since the inventors use the adaptive processing algorithm. However, the DAG of the inventors and matrix data structures could be used by any top-k algorithm to determine (i) the highest score of a partial match during query evaluation and (ii) if a partial match should be pruned or not depending on its score upper bound.

Algorithm 2 below is a sketch of the top-k algorithm that the inventors use. It starts by evaluating the query root node. Then, it determines the partial matches with the highest score potential using getHighestPotential which relies on score upper bounds extracted from the DAG to prioritize partial matches. The algorithm then expands those matches by computing the next best query node for each one of them. Note that the algorithm treats each partial match individually (as opposed to a batch processing). When a partial match is generated, it is checked against the top-k list (updateTopK). The partial match may be used to update the top-k list or it may be carried to the next step or it may be pruned. The algorithm stops when all query nodes have been evaluated for all matches in the top-k list and there is no other match that is waiting to be processed.

---

Algorithm 2 A Generic top-k Algorithm

Require: Query Q. Document D
1: PartialMatches=getRootNodes(D.Q);
  {PartialMatches is the set of partially evaluated answers.}
2: topK=empty;
  {the while condition checks if all K answers in topK are complete, and if no partial match has potential final scores higher than current topK matches.}
3: while !checkTopK(topK) do
4:   currentMatch=getHighestPotential(PartialMatches);
    {partial match with the highest potential final score.}
5:   newMatches=expandMatch(currentMatch.Q.D);
    {chooses the next best query node to evaluate for currentMatch and may generate many new matches.}
6:   PartialMatches+=newMatches;
    {adds expanded partial matches to PartialMatches.}
7:   topK=updateTopK(newMatches);
    {updateTopK keeps the best K answers in topK}
8: end while

---

In this section the inventors briefly discuss our implementation of top-k query processing techniques and then present extensive quality and efficiency evaluations of the proposed XML scoring methods.

Our experimental evaluation compares the five scoring methods: binary-independent, binary-correlated, path-independent, path-correlated, and twig. Twig results in the perfect top-k answer. Our results show that the binary scoring methods allow for fast DAG preprocessing and query execution times, in exchange for degraded answer quality. When score quality is important, both path methods offer good quality answers, but path-correlated requires high preprocessing times. In contrast, path-independent offers good answer quality (often perfect), while saving in terms of preprocessing times.

The inventors implemented our top-k strategies such that all idf s and score upper bounds are accessed through the DAG. Our (idf, tf) scoring measure assigns the same idf s to matches that share the same (relaxed) query pattern. Ties on such matches are broken based on the answers tf's. Since, unlike idf, each match has an individual tf score, it is more efficient to estimate the tf of a match during query evaluation based on selectivity estimates (which can be stored in the DAG). However, in order to avoid skewing results in our experimental evaluation of idf scoring, one aspect of the invention is that the inventors do not take tf's into account.

The inventors implemented the DAG and query matrix structures, as well as the top-k query processing strategies in a programming language such as C++. Any language that is appropriate will do. The inventors ran the experiments on a Red Hat 7.1 Linux 1.4 GHz dual-processor machine with 2 Gb of RAM. Any computing device may be used, however.

The data and queries are discussed next. To offer a comprehensive evaluation of our scoring methods, in terms of time and space, as well as their effect on query processing, the inventors performed experiments on synthetic XML data. Results on real data are given below.

The inventors generated heterogeneous collections of documents using the Toxygene document generating tool. In order to enable query relaxation, documents of various sizes were generated using heterogeneous DTDs. For our synthetic experiments, the created documents contain simple node labels (e.g., <a> and <b>), and U.S. state names as text content. The inventors then ran experiments on different datasets by assembling documents based on size (in terms of number of nodes). Experiments were performed on collections where the inventors varied the parameters of the datasets such as correlation or number of exact answers. The correlation of a dataset as the type of matches was measured to query predicates that are present in the dataset: simple binary predicates (no correlation), binary predicates only, binary predicates and simple path predicates, binary and path predicates, and mixed (all three types of predicates are present in the dataset). The number of exact answers is a percentage of the top-k answers that are exact answers to the query. The values were reported for correlation and the number of exact answers with respect to our default query $q^3$.

The various aspects of the invention were evaluated on 18 different queries exhibiting different sizes, query structures (twig shapes), and content predicates. These 18 queries were chosen to illustrate the different possible query relaxation structures that may happen in a real-world scenario.

q0: a [./b/c]
q1: a [./b] [./c]
q2: a [./b/c/d]
q3: a [./b[./c/]/d]
q4: a [./b] [./c] [.d]
q5: a [./b/c/d/e]
q6: a [./b[./c]/d/e]
q7: a [./b/c/d/e/f]
q8: a [./b[./c/d]/e/f]
q9: a [./b[./c[./e]/f]/d] [./g]
q10: a [contains (./b, "AZ")]
q11: a [contains (., "WI") and contains (., "CA")]
q12: a [contains (./b/c, "AL")]
q13: a [contains (./b, "AL") and contains (./b, "AZ")]
q14: a [contains (., "WA") and contains (., "NV") and contains (., "AR")]
q15: a [contains (./b, "NY") and contains (./b/d, "NJ")]
q16: a [contains (./b/c/d/e, "TX")]
q17: a [contains (./b/c, "TX") and contains (./b/e, "VT")]

Synthetic data experiments were performed in varying different parameters: query size, query shape, document size (in terms of number of nodes that satisfy each query node), document correlation, number of exact answers, k. The default parameters the inventors used for our experiments are summarized in Table 1.

Finally, the inventors also ran several experiments on a real dataset: the XML version of the Wall Street Journal Treebank4 corpora. Treebank provides text annotations of English sentences, the dataset the inventors use consists of annotated Wall Street Journal text. Sentences are broken using tags representing various grammatical (phrases) and speech structures. For instance, <NP> represents a noun phrase within a sentence (<S>), the noun phrase can include different part-of-speech such as a singular noun (<NN>). Tags used in the queries the inventors tested include: prepositional phrase (<PP>) verb phrase (<VP>), determiner (<DT>), interjection, (<UH>), comparative adverb (<RBR>), and possessive ending (<POS>). The inventors ran experiments on 6 queries of different sizes and shapes:

TB0: S[./UH and contains (./VP, "There")]
TB1: S[./NN[/NP]/DT]
TB2: NP[./S/PP/NN]
TB3: VP[./S/[./NP]/PP/NN]
TB4: VP[./S/NP/PP/NN]
TB5: S[./VP[./RBR] [./POS] and contains (./VP, "should")]

To compare the performance of the idf scoring mechanisms, the following measures were used:

DAG Size: Memory size needed to store the DAG structure. This shows the memory size needed for each method.

DAG Preprocessing Time: Time needed to build the DAG, compute the idf scores and all optional information stored in the DAG. In order to isolate the effect on scores approximation due to binary and path scoring methods, the inventors computed the exact idf scores by exploring all matches. This preprocessing step can be improved using selectivity estimation methods.

Precision: Percentage of top-k answers (and their ties) that are correct top-k answers (or ties to the correct top-k answer), according to the exact twig scoring method. Answer ties are answers to the query that share the same idf as the $K^{th}$ returned answer. Our Precision measure takes possible ties into account in order to penalize scoring methods that produce too many possible top-k results (i.e., scoring methods that produce many answers with the same score) compared to the twig method. The precision measure gives some information about the quality of the answers returned.

Query Processing Time: Time needed to compute the top-k answer to the query, in addition to the DAG preprocessing time. This measure shows how score distribution impacts query processing time.

TABLE I

Experimental Default Settings

| Query Size | Query Shape | Document Size | Document Correlation | # of Exact Answers | k |
|---|---|---|---|---|---|
| q3 (4 nodes) | q3 (twig) | [0, 1000] | Mixed (with respect to q3) | 12% (with respect to q3) | 2.5 |

Experimental results for the evaluation of the different scoring strategies are next presented. The path and twig scoring potentially result in different idf score values for each node in the relaxation DAG described above. Binary scoring does not assign different idf's to all DAG nodes, but only to those that result in different binary query structures. In order to save memory space, and DAG preprocessing time, it is therefore possible to only build a subset of the relaxation DAG when considering binary scores. A simple way to implement this optimization is to convert the original query into a binary predicate query, and build the relaxation DAG from this transformed query.

Figure 5:
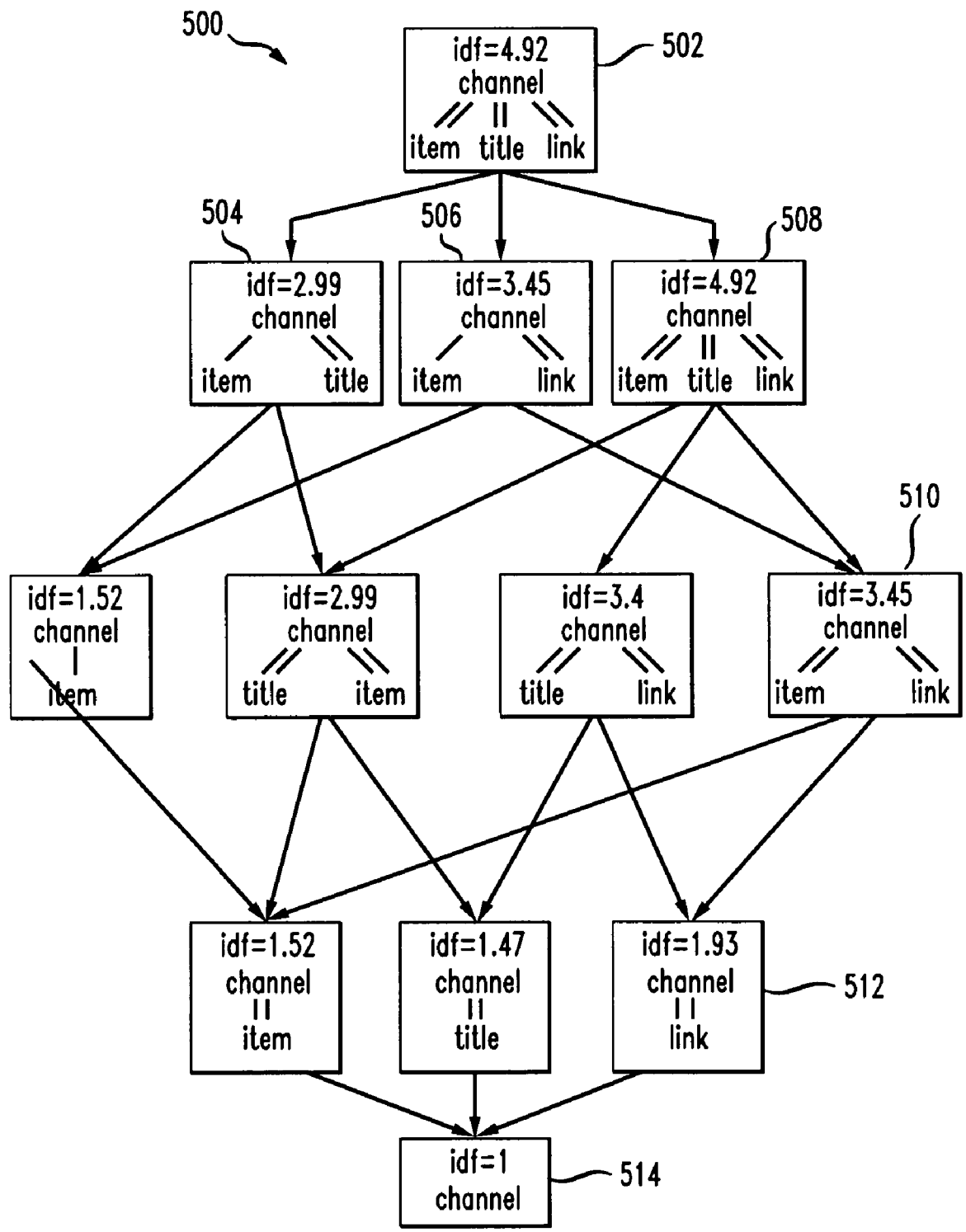
FIG. 5 illustrates a query relaxations DAG for binary scoring.

FIG. 5 shows the DAG 500 that results from binary scoring (assuming independent predicate scoring for the idf scores) of the query in FIG. 3. Since the binary version of the query is much simpler than the query itself and results in fewer possible relaxations, its DAG is smaller than, or the same size as the original relaxation DAG; 12 nodes vs. 36 nodes in our example. Experimental evaluation shows that for queries that do not only consist of binary predicates but also offer some complex structural patterns, the DAGs for the twig and path scoring methods are an order of magnitude larger than the DAGs for the binary scoring methods. However, these more complex DAGs are still of a reasonable size (1 MB for our larger query $q^9$) and can therefore be easily kept in main memory during top-k query processing. Several nodes are highlighted 502, 504, 506, 508, 510, 512 and 514.

Figure 6:
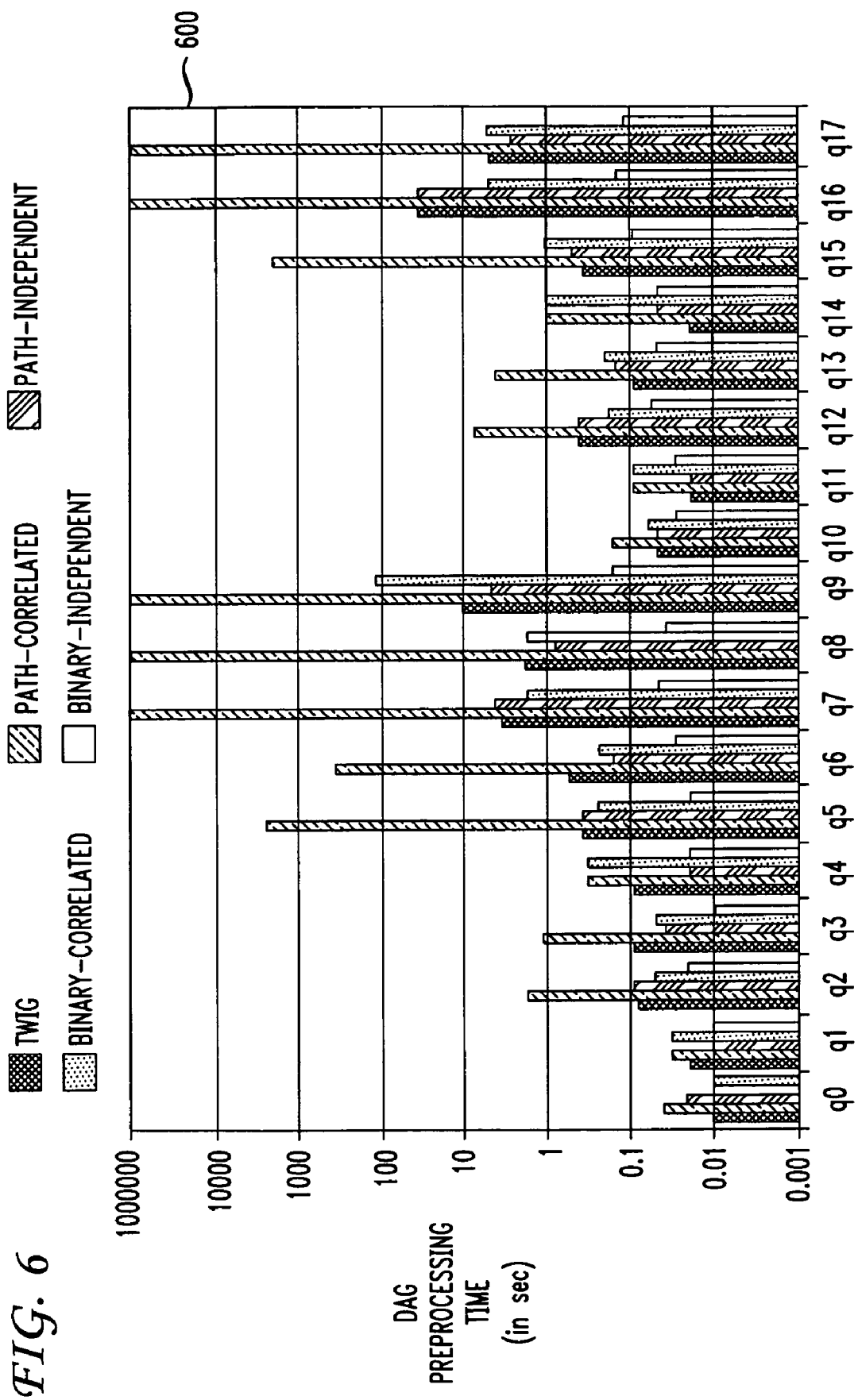
FIG. 6 illustrates a graph of DAG processing time.

The preprocessing times needed to build the DAGs and compute the idf scores for each of our scoring methods are shown in a graph 600, for all 18 queries over a small dataset, in FIG. 6 which is on a logarithmic scale. The path-correlated method is the most expensive and its cost grows rapidly with the query size, with times greater than 100,000 secs for $q^7$, $q^8$, $q^9$, $q^{16}$, and $q^{17}$; its high cost is mostly due to very expensive score computation and propagation. Path-independent and twig are faster, with path-independent faster than twig for all non-chain queries. For chain queries: $q^0$, $q^2$, $q^5$, $q^7$, $q^{10}$, $q^{12}$ and $q^{16}$, the preprocessing times of twig and path-independent are similar. For these two methods, exploring all matches dominates preprocessing time. In the case of chain queries, the matches considered are the same for twig and path-independent, path-independent is slightly slower due to some score propagation (sum computation overhead). Note that this overhead will become negligible as the document collection size increases. The two binary methods are faster than their path counterparts, as they work on a smaller DAG, but they offer smaller score ranges. Binary correlated can be expensive as the query size increases, and is often more expensive than twig. Since both correlated methods are outperformed by twig, the inventors will not report further results for these methods in this paper.

Figure 7:
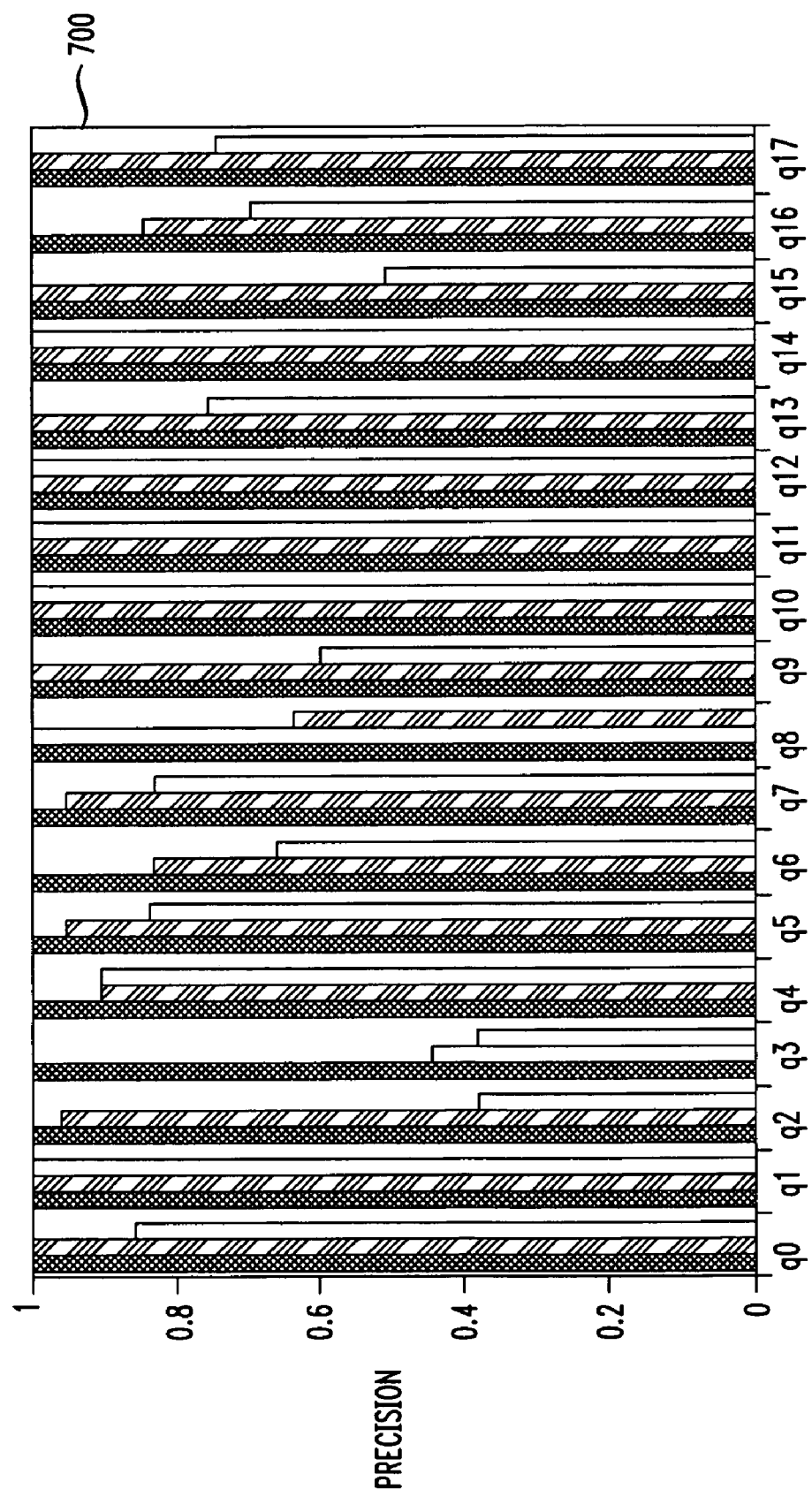
FIG. 7 illustrates top-k precision for twig, path and binary scoring.

FIG. 7 shows the precision of top-k query evaluation strategies 700 when using the three remaining methods. The twig method has the perfect precision. Path-independent has very good precision, often equal to 1, or close. Binary-independent has the worst precision, as it does not offer a fine granularity of scores. If time is the main constraint, then binary independent allows for fast preprocessing time in exchange for some degradation in score quality. If score quality is important, for chain queries, the twig approach is the best as it provides perfect precision, and is as fast as path-independent; for queries having more complex shapes, path-independent provides the best quality/preprocessing time tradeoff.

The processing time needed to evaluate a top-k query with the different scoring methods was also compared using the top-k query evaluation strategies. The twig and path techniques results in similar query execution times. However, the inventors observed that the binary approaches may result in slightly faster query processing times, as more partial matches end up with the highest scores, allowing to identify a top-k set earlier in the execution and discard low-quality matches faster. This makes binary-independent the method of choice when time is an issue. An in-depth comparison of the performance of top-k query processing strategies is beyond the scope of this disclosure. See, A. Marian, S. Amer-Yahia, N. Koudas, D. Srivastava. Adaptive Processing of Top-k Queries in XML. ICDE 2005, incorporated herein.

Figure 8:
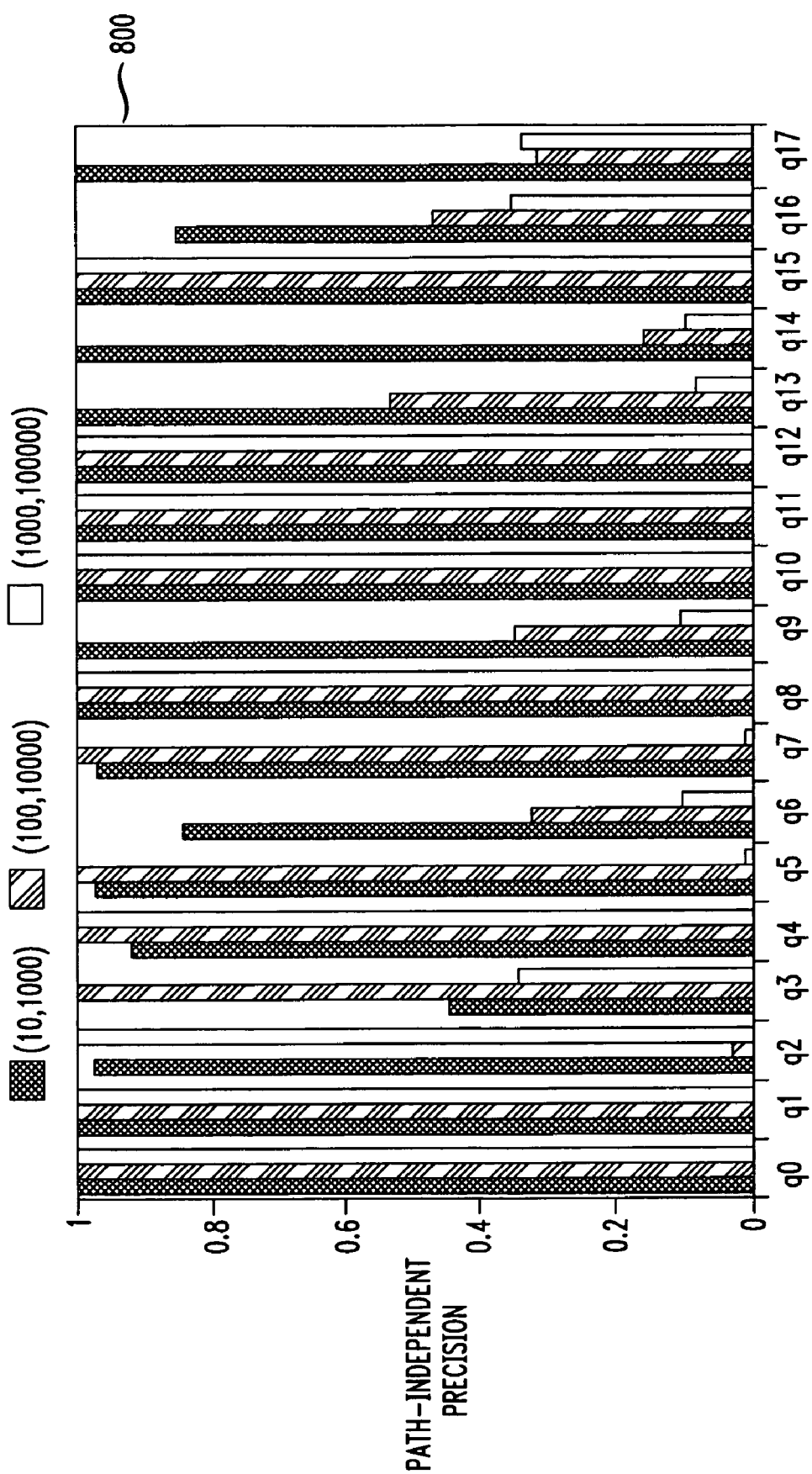
FIG. 8 illustrates top-k precision for path scoring.

Discussed next are various parameters that affect quality and speed of the proposed scoring methods. FIG. 8 shows a graph 800 illustrating the effect of document size, in terms of the number of document nodes that match each query node, on the precision of path-independent on a subset of the synthetic data queries. While precision is mostly affected by data distribution, larger documents may end up producing more ties to the top-k answers, which in turn leads to lower precision values. Precision results for path-independent in FIG. 8 are good overall. The queries that suffer the most from the simplified path scoring compared to the complex twig scoring are those queries that have twig patterns that have branching nodes below the root node, as the correlation in these patterns is lost by the path-independent scoring. Note that the chain queries $q^2$, $q^5$, and $q^7$ have low precision for one dataset: this is partly due to the fact that most of the answers to these queries are relaxed answers, and exhibit a twig pattern (due to subtree promotion), and to the presence of multiple ties in the answer set. Since the precision measure penalizes scoring approaches that produce many ties to the top-k answers, some queries exhibit low values of precision for path-independent. In these cases, many answers tend to be assigned high scores, resulting in low precision values, although the exact answers are part of the high scoring answers. Note that this behavior is data- and query-dependent, which is the reason why $q^2$ has low precision for the medium dataset, while $q^5$ and $q^7$ have low precision for the large dataset. In addition, the inventors compared path-independent and twig preprocessing times. The results are consistent with those in FIG. 6, and show that path-independent allows for faster DAG preprocessing times than twig when the query does not consist of a single chain. When queries have multiple paths (or binary) predicates, the savings in preprocessing time can be significant: up to 83% for the binary query $q^4$, and 72% for the twig query $q^6$.

Figure 9:
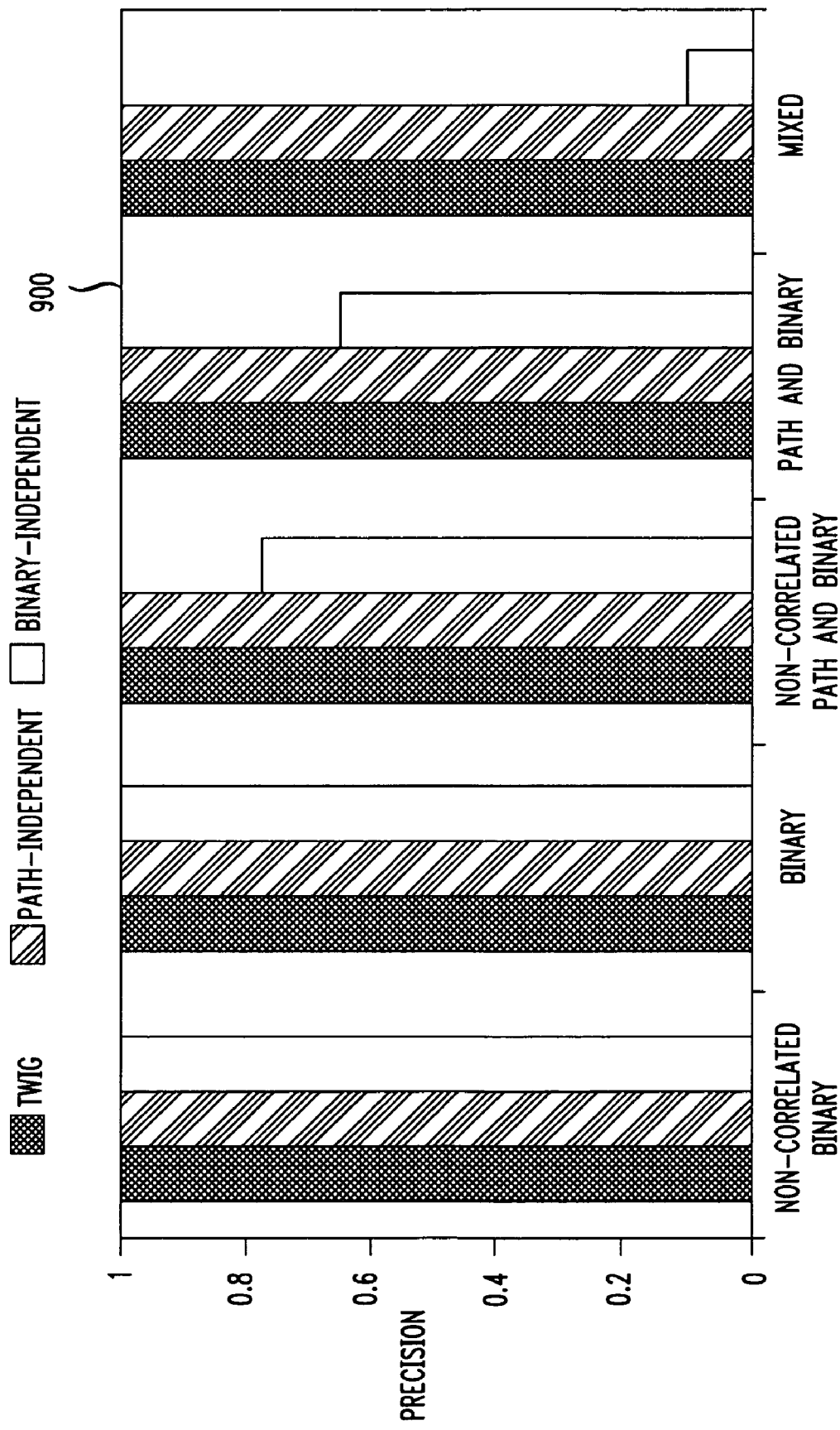
FIG. 9 illustrates precision for datasets with various degrees of correlation.

The inventors now look at the effect of data correlation on the quality of top-k answers. FIG. 9 shows a graph 900 illustrating the precision for our scoring methods for $q^3$ on datasets exhibiting different answer types. For example, the binary dataset only produces answers that consist of binary predicates, while the mixed dataset produces answers that exhibit all three predicate patterns: binary, path and twig. As expected, as soon as some of the answers have complex predicates (twig or binary), the precision of the binary-independent scoring method drops. Interestingly, path-independent precision stays equal to one for all datasets, with the notable exception of the binary non-correlated path dataset. Note that for that particular dataset, path-independent top-k answers have an accuracy of 64% (64% of the returned answers are part of the k top answers as returned by twig), however, the precision is much lower, as path-independent returns a high number of ties.

Path-independent has a perfect precision for datasets that produce correlated paths and twig answers. While path-independent does not take this correlation into account, the score ordering of the answers is not impacted, as the underlying predicate distribution is uniform. When individual path predicates have very different idf values, path-independent answers may be of low quality because the score ordering of answers may be different from that of twig. In effect, this means that sibling DAG nodes (DAG nodes that do not have an ancestor/descendant relationship, and therefore have no ordering constraint on their scores) may have their score ordering reversed between the twig and path-independent DAGs. The inventors believe that this situation does not happen very often in practice.

Figure 10:
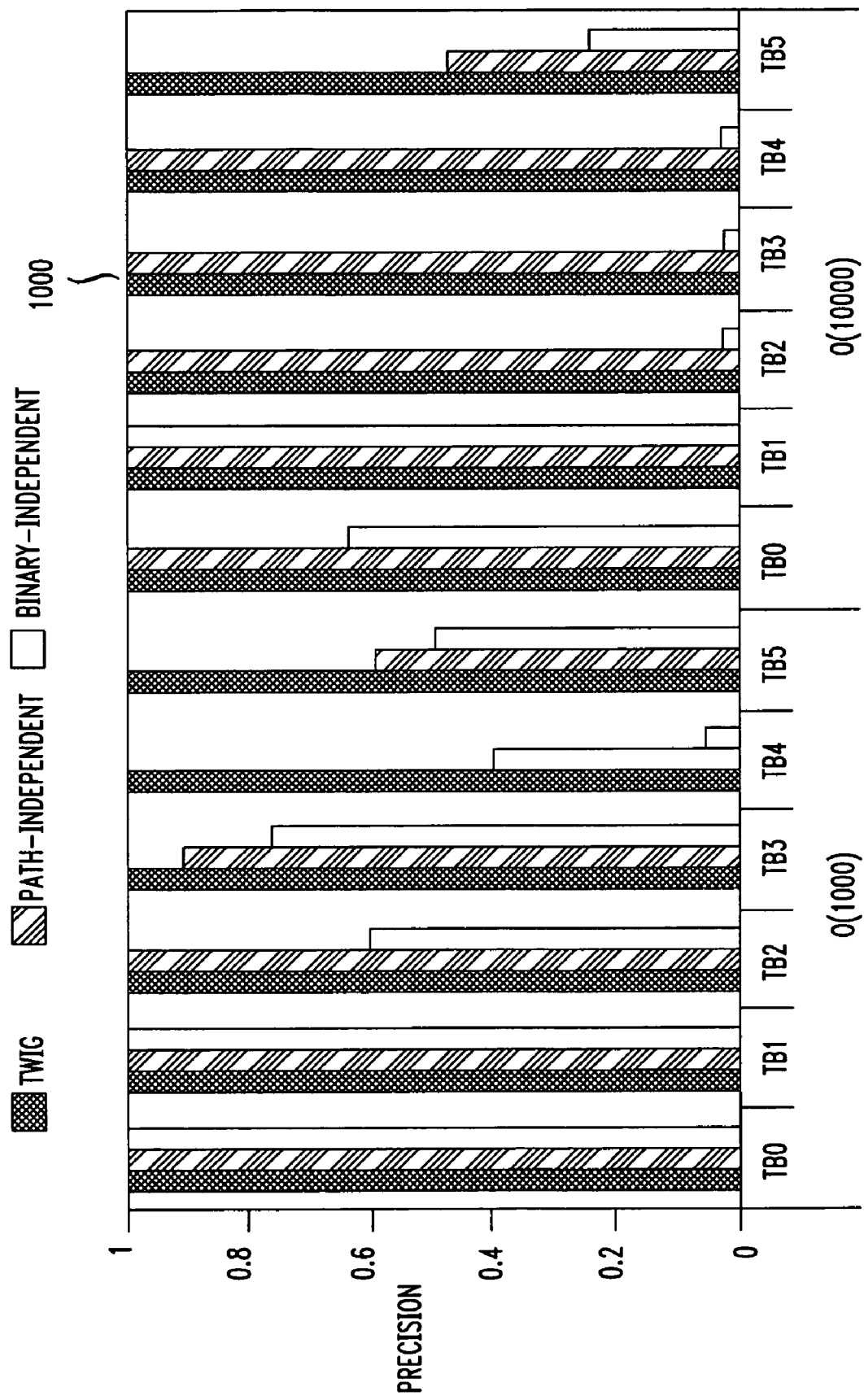
FIG. 10 illustrates precision for the Treebank datasets.

FIG. 10 shows a graph 1000 illustrating the precision values for the 6 queries over the Treebank dataset. The inventors considered two fragments of the dataset, with different sizes. Results are consistent with what the inventors observed for synthetic data, with binary-independent offering low precision, and path-independent offering high precision, often perfect. For our real data experiments, path-independent lowest precision was 0.4, but in two thirds of the query tested path-independent exhibited perfect precision.

In conclusion, the inventors presented a family of scoring methods, inspired by the tf*idf approach, that account both for the structure and the content in XML documents. The methods score relaxed answers to XML queries in a way that guarantees that the closer an answer is to the exact query, the higher is its score. The inventors also proposed efficient implementation of structures to speed up XML top-k query evaluation in this setting. By keeping the DAG structures for queries that users are interested in and updating the score information in a dynamic fashion that can provide an efficient and high quality top-k query answering approach for a throughput-oriented streaming framework.

Figure 11:
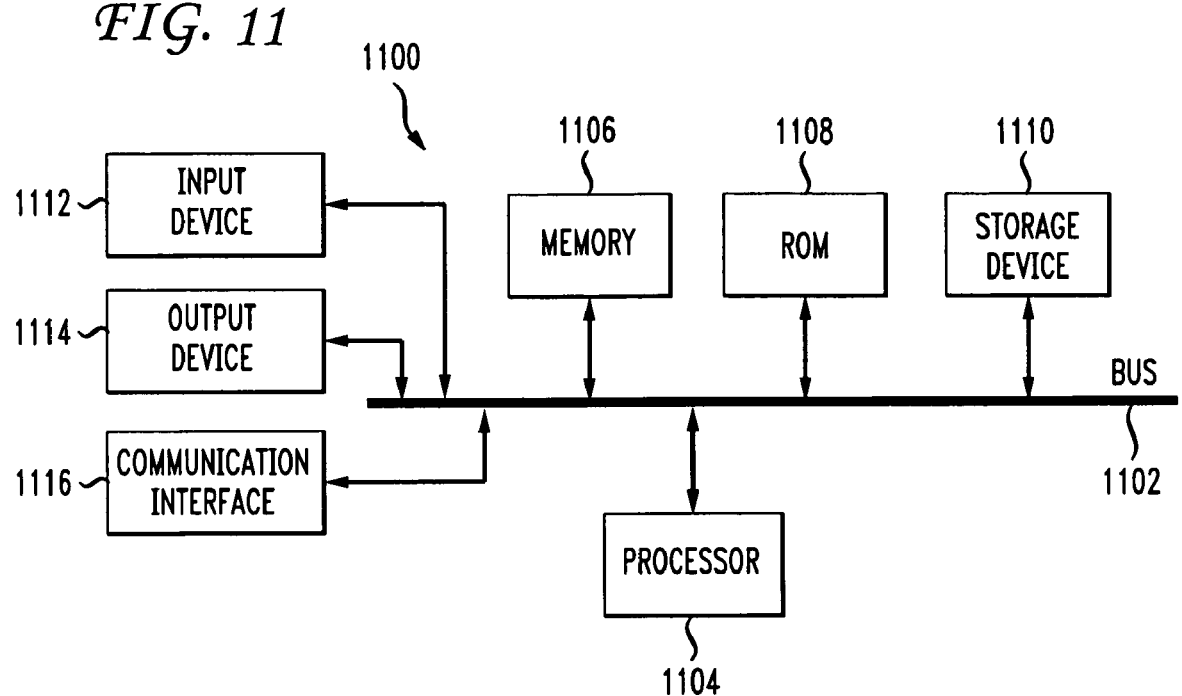
FIG. 11 illustrates an example computing device associated with the invention.

FIG. 11 illustrates a block diagram of an exemplary processing device 1100 which may implement a user workstation or server consistent with the principles of the invention. Processing device 1100 may be, for example, a personal computer (PC), a portable computing device, a computer server or any other type of processing device. Processing device 1100 may include a bus 1102, a processor 1104, a memory 1106, a read only memory (ROM) 1108, a storage device 1110, an input device 1112, an output device 1114, and a communication interface 1116. Bus 1102 may permit communication among the components of the computing device. Processor 1104 may include at least one conventional processor or microprocessor that interprets and executes instructions. Memory 1106 may be a random access memory (RAM) or another type of dynamic storage device that stores information and instructions for execution by processor 1104. Memory 1106 may also store temporary variables or other intermediate information used during execution of instructions by processor 1104. ROM 1108 may include a conventional ROM device or another type of static storage device that stores static information and instructions for processor 1104. Storage device 1110 may include any type of media, such as, for example, magnetic or optical recording media and its corresponding drive. Input device 1112 may include one or more conventional mechanisms that permit a user to input information to system 1100, such as a keyboard, a mouse, a pen, a voice recognition device, a microphone, a headset, etc. Output device 1114 may include one or more conventional mechanisms that output information to the user, including a display, a printer, one or more speakers, a headset, or a medium, such as a memory, or a magnetic or optical disk and a corresponding disk drive. Communication interface 1116 may include any transceiver-like mechanism that enables a computing device to communicate via a network. For example, communication interface 1116 may include a modem, or an Ethernet interface for communicating via a local area network (LAN). Alternatively, communication interface 1116 may include other mechanisms for communicating with other devices and/or systems via wired, wireless or optical connections.

Processing device 1100 may perform such functions in response to processor 1104 executing sequences of instructions contained in a computer-readable medium, such as, for example, memory 1106, a magnetic disk, or an optical disk. Such instructions may be read into memory 1106 from another computer-readable medium, such as storage device 1110, or from a separate device via communication interface 1116.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in anyway. Other configurations of the described embodiments of the invention are part of the scope of this invention. Accordingly, the appended claims and their legal equivalents should only define the invention, rather than any specific examples given.

We claim:

1. A method of computing score of candidate answers to a database query, the method comprising:
- receiving the database query;
- converting the database query to a binary predicate query;
- assigning a first score to a match to the binary predicate query, the database query organized as a node labeled tree and the first score being associated with a relative importance of an individual keyword in a collection of documents, each document in the collection of documents organized as the node labeled tree, based on all structural and content predicates in the database query, wherein assigning the first score captures all the structure and content predicates in the database query by applying an edge relaxation, a leaf deletion relaxation and a subtree promotion relaxation to the node labeled tree of the database query;
- assigning a second score to the match, the second score being associated with a relative importance of a keyword in an individual document in the collection of documents; and
- computing an answer score for the database query based on the first score and second score.

2. The method of claim 1, wherein assigning the second score to the match comprises assigning the second score based an inverse document frequency.

3. The method of claim 2, wherein assigning the second score to the match comprises assigning a term frequency score.

4. The method of claim 1, wherein the database query is an XML query.

5. The method of claim 4, further comprising:
- precomputing and storing inverse document frequencies for all possible relations of the XML query.

6. The method of claim 5, wherein precomputing is performed using at least one of a query relaxation directed acyclic and a query matrix.

7. The method of claim 1, wherein the query is a twig query and the method further comprises:
- generating an approximate answer to the twig query by generating at least one relaxed twig query.

8. The method of claim 7, further comprising organizing the at least one relaxed twig query into a directed acyclic graph.

9. The method of claim 1, wherein the answer score is computed using top-k processing.

10. The method of claim 1, wherein the content predicates further comprise keyword predicates.

11. A non-transitory computer-readable medium storing instructions for controlling a computing device to compute a score of candidate answers to a database query, the instructions comprising:
- receiving the database query;
- converting the database query to a binary predicate query;
- assigning a first score to a match to the binary predicate query, the database query organized as a node labeled tree and the first score being associated with a relative importance of an individual keyword in a collection of documents, each document in the collection of documents organized as the node labeled tree, based on all structural and content predicates in the database query, wherein assigning the first score captures all the structure and content predicates in the database query by applying an edge relaxation, a leaf deletion relaxation and a subtree promotion relaxation to the node labeled tree of the database query;
- assigning a second score to the match, the second score being associated with a relative importance of a keyword in an individual document in the collection of documents; and
- computing an answer score for the database query based on the assigned first score and second score.

12. The non-transitory computer-readable medium of claim 11, wherein assigning the second score to the match comprises assigning the second score based an inverse document frequency.

13. The non-transitory computer-readable medium of claim 12, wherein assigning the second score to the match comprises assigning a term frequency score.

14. The non-transitory computer-readable medium of claim 11, wherein the query is a twig query and the method further comprises:
- generating an approximate answer to the twig query by generating at least one relaxed twig query.

15. The non-transitory computer-readable medium of claim 14, wherein the instructions further comprise organizing the at least one relaxed twig query into a directed acyclic graph.

16. The non-transitory computer-readable medium of claim 14, wherein the database query is an XML query, and wherein the instructions further comprise:
- precomputing and storing inverse document frequencies for all possible relations of the XML query.

17. The non-transitory computer-readable medium of claim 16, wherein precomputing is performed using at least one of a query relaxation directed acyclic graph and a query matrix.

18. A system for computing score of candidate answers to a database query, the system comprising:
- a processor;
- a first module configured to control the processor to receive the database query;
- a second module configured to control the processor to convert the database query to a binary predicate query;
- a third module configured to control the processor to assign a first score to a match to the binary predicate query, the database query organized as a node labeled tree and the first score being associated with a relative importance of an individual keyword in a collection of documents, each document in the collection of documents organized as the node labeled tree, based on all structural and content predicates in the database query, wherein assigning the first score captures all the structure and content predicates in the database query by applying an edge relaxation, a leaf deletion relaxation and a subtree promotion relaxation to the node labeled tree of the database query;
- a fourth module configured to control the processor to assign a second score to the match, the second score being associated with a relative importance of a keyword in an individual document in the collection of documents; and
- a fifth module configured to control the processor to use the assigned first score and second score to compute an answer score for the database query.

* * * * *